(12) United States Patent
Kovsh et al.

(10) Patent No.: US 8,682,159 B2
(45) Date of Patent: Mar. 25, 2014

(54) OPTICAL COMMUNICATION SYSTEM SUPPORTING DETECTION AND COMMUNICATION NETWORKS

(75) Inventors: Dmitriy I. Kovsh, Hoboken, NJ (US); Ekaterina A. Golovchenko, Colts Neck, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 656 days.

(21) Appl. No.: 12/169,787

(22) Filed: Jul. 9, 2008

(65) Prior Publication Data

US 2010/0008666 A1    Jan. 14, 2010

(51) Int. Cl.
*H04B 10/00* (2013.01)
(52) U.S. Cl.
USPC ............... 398/33; 398/31; 398/30; 398/25; 398/177
(58) Field of Classification Search
USPC ............ 398/140–141, 160, 173–181, 25–38
See application file for complete search history.

(56) References Cited

U.S. PATENT DOCUMENTS

| 4,648,083 | A | * | 3/1987 | Giallorenzi | 367/149 |
|---|---|---|---|---|---|
| 5,051,965 | A | * | 9/1991 | Poorman | 367/149 |
| 5,473,459 | A | * | 12/1995 | Davis | 398/141 |
| 5,535,037 | A | * | 7/1996 | Yoneyama | 398/181 |
| 6,005,694 | A | * | 12/1999 | Liu | 398/6 |
| 6,166,836 | A | * | 12/2000 | Crameri et al. | 398/18 |
| 6,314,056 | B1 | * | 11/2001 | Bunn et al. | 367/149 |
| 6,342,962 | B2 | | 1/2002 | Marcerou et al. | |
| 6,377,373 | B1 | * | 4/2002 | Kawazawa et al. | 398/82 |
| 6,639,701 | B1 | * | 10/2003 | Hirst | 398/5 |
| 6,788,417 | B1 | * | 9/2004 | Zumberge et al. | 356/477 |
| 6,804,469 | B2 | * | 10/2004 | Kasahara et al. | 398/177 |
| 6,850,461 | B2 | * | 2/2005 | Maas et al. | 367/20 |
| 6,895,187 | B1 | * | 5/2005 | Webb | 398/104 |
| 6,982,925 | B2 | * | 1/2006 | Maas et al. | 367/13 |
| 7,103,275 | B2 | * | 9/2006 | Fujiwara | 398/31 |
| 7,113,706 | B2 | * | 9/2006 | Feinberg | 398/104 |
| 7,133,611 | B2 | * | 11/2006 | Kaneko | 398/30 |
| 7,146,100 | B2 | * | 12/2006 | Osaka | 398/30 |
| 7,158,728 | B2 | * | 1/2007 | Kasahara et al. | 398/177 |
| 7,274,871 | B2 | * | 9/2007 | Avallone et al. | 398/30 |
| 7,326,916 | B2 | * | 2/2008 | Sugiyama et al. | 250/227.14 |
| 7,415,211 | B2 | * | 8/2008 | Feinberg et al. | 398/104 |
| 7,424,224 | B2 | * | 9/2008 | Feinberg | 398/104 |
| 7,437,070 | B2 | * | 10/2008 | Fujieda et al. | 398/31 |
| 7,469,104 | B2 | * | 12/2008 | Neubelt | 398/104 |
| 7,539,413 | B2 | * | 5/2009 | Munehira et al. | 398/31 |
| 7,551,517 | B2 | * | 6/2009 | Berg et al. | 367/149 |
| 7,657,176 | B2 | * | 2/2010 | Yokota et al. | 398/10 |
| 7,751,713 | B2 | * | 7/2010 | Perkins et al. | 398/81 |

(Continued)

OTHER PUBLICATIONS

International Search Report and Written Opinion dated Sep. 1, 2009 issued in related International Patent Application No. PCT/US2009/049885.

*Primary Examiner* — Agustin Bello

(57) ABSTRACT

An optical communication system supporting detection and communication networks. A communication network transmission path and the detection network transmission path are provided as separate paths established by separate fibers or fiber pairs of the same optical fiber cable. All of the elements coupled to the communication network transmission path and the detection network transmission path may be powered by the same power feed equipment through the same optical fiber cable power conductor.

11 Claims, 1 Drawing Sheet

(56) References Cited

U.S. PATENT DOCUMENTS

| | | | |
|---|---|---|---|
| 7,755,971 B2 * | 7/2010 | Heatley et al. | 367/16 |
| 7,805,032 B1 * | 9/2010 | Moskowitz et al. | 385/16 |
| 7,817,279 B2 * | 10/2010 | Healey | 356/450 |
| 7,848,645 B2 * | 12/2010 | Healey et al. | 398/16 |
| 7,885,539 B2 * | 2/2011 | Leppla et al. | 398/13 |
| 7,969,817 B2 * | 6/2011 | Berg et al. | 367/20 |
| 8,000,609 B2 * | 8/2011 | Healey et al. | 398/141 |
| 8,396,360 B2 * | 3/2013 | Healey et al. | 398/16 |
| 2002/0057477 A1 | 5/2002 | Rocca et al. | |
| 2002/0080447 A1 * | 6/2002 | Fells et al. | 359/141 |
| 2003/0059156 A1 * | 3/2003 | Feinberg et al. | 385/24 |
| 2005/0095006 A1 * | 5/2005 | Evangelides et al. | 398/158 |
| 2006/0251423 A1 * | 11/2006 | Evangelides et al. | 398/105 |
| 2007/0154219 A1 * | 7/2007 | Feinberg | 398/104 |
| 2010/0008666 A1 * | 1/2010 | Kovsh et al. | 398/58 |
| 2010/0316375 A1 * | 12/2010 | Kram et al. | 398/25 |

* cited by examiner

OPTICAL COMMUNICATION SYSTEM SUPPORTING DETECTION AND COMMUNICATION NETWORKS

TECHNICAL FIELD

The present application relates to optical communication systems, and, in particular, to an optical communication system supporting detection and communication networks.

BACKGROUND

Undersea optical communication systems may include an optical transmission path extending between shore stations separated by distances of thousands of kilometers. The optical transmission path may include an optical fiber cable coupled from one shore station to another through numerous elements, such as repeaters, branching units, etc. The optical fiber cable may include multiple optical fiber pairs for bi-directional transmission of information, e.g. on a plurality of separate wavelength channels in a wavelength division multiplexed (WDM) system. The optical fiber cable, as well as housings associated with elements connected thereto, may rest on the ocean floor.

A variety of optical cable configurations are known. FIG. 1 is a simplified cross-sectional illustration of one exemplary optical fiber cable 100. As shown, the optical fiber cable 100 may include one or more layers of insulation or armor 102. A number of individual optical fibers 104, each having its own insulation, cladding and core, may be provided within the cable. A power conductor 106 may be provided at the center of the cable for providing electrical energy to remote system elements, e.g. repeaters, etc., located along the length of the cable.

A current supplied on the cable power conductors may be provided by power feed equipment (PFE) located at a shore station. For example, the cable power conductor may be connected to a positive PFE terminal at one shore station and to a negative PFE terminal at the shore station at the opposite end of the cable. A variety of power feed equipment configurations are known.

Optical systems have also been configured as detection systems for performing ocean observing functions. Such detection systems may include an optical transmission path including an optical fiber cable and other elements, such as sensors, extending between shore stations. The sensors coupled to the cable may be powered by PFE at the shore stations through a power conductor of the cable. The sensors may be deployed for a variety of purposes, such as observing the earth-ocean-atmosphere system, predicting seismic and/or tsunami events, surveillance, etc. . . .

BRIEF DESCRIPTION OF THE DRAWINGS

Reference should be made to the following detailed description which should be read in conjunction with the following figures, wherein like numerals represent like parts.

DETAILED DESCRIPTION

Figure 2:
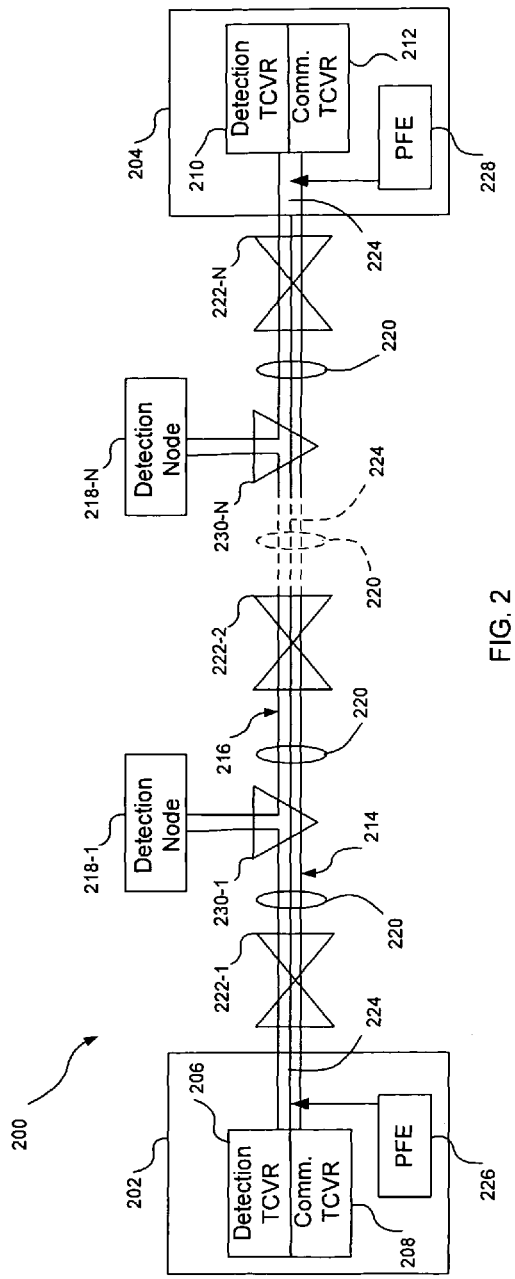
FIG. 2 is a simplified block diagram of one exemplary embodiment of an optical communication system consistent with the present disclosure.

Turning now to FIG. 2, there is illustrated an exemplary optical communication system 200 consistent with the present disclosure. Those skilled in the art will recognize that the system 200 has been depicted as a highly simplified point-to-point system for ease of explanation. It is to be understood the present disclosure may be incorporated into a wide variety of optical network and system configurations.

The illustrated exemplary optical communication system 200 includes a first shore station 202 and a second shore station 204. The first shore station 202 may include a first detection network transceiver 206 and a first communication network transceiver 208. The second shore station 204 may include a second detection network transceiver 210 and a second communication network transceiver 212. For ease of explanation the description herein may refer to transmission from one transceiver to another. It is to be understood, however, that the system 200 may be configured for bi-directional or uni-directional communication from one detection network transceiver to the other and from one communication network transceiver to the other.

The system 200 may be configured to establish a wavelength division multiplexed (WDM) communication network between the communication system transceivers 208, 212 and a detection network between the detection network transceivers 206, 210. With respect to the WDM communication network, for example, the communication system transceiver 208 may generate a plurality of separate optical signals by modulating data on each of a plurality of different wavelengths/channels within a signal bandwidth. The data may be modulated on at least one of the channels at a high bit rate, e.g. 10 Gb/sec or more. The channels may be multiplexed into an aggregate optical signal and transmitted by the transceiver 208 over a communication system transmission path 214 to the communication system transceiver 212. At the transceiver 212, the aggregate signal may be demultiplexed into the separate optical signals for demodulation of the data modulated thereon.

The detection network transceiver 206 may transmit low bit rate detection network optical signals over a detection network transmission path 216 to one or more detection network nodes 218-1 . . . 218-N. The detection network optical signals may be, for example, time division multiplexed (TDM) on a single optical wavelength at a bit rate of as low as Synchronous Optical Network (SONET) optical carrier level OC-1. The detection network optical signals may also or alternatively be provided on a plurality of different wavelengths/channels.

Each of the detection network nodes 218-1 . . . 218-N may include one or more known detectors for performing a detecting or sensing function, such as acoustic sensing, wave motion, chemical sniffing, radiological sensing, video sensing, optical sensing, meteorological sensing, and tectonic motion sensing. The detection network nodes 218-1 . . . 218-N and may be configured to impart detector data representing the detected or sensed conditions/objects on the detection network signals for transmission to the detection network transceiver 210 over the detection network transmission path. The transceiver 210 may monitor the data for detected conditions and/or may transmit the data to other networks or systems so that the data may be monitored. The detection network established by path 216 may be used in a body of water, for example, to monitor the environment, to monitor vehicle traffic along a body of water, detect conditions that are indicative of a potential threat, etc.

Figure 1:
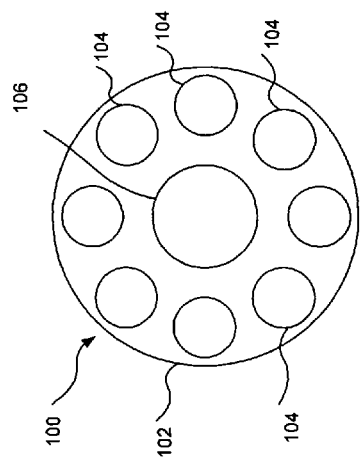
FIG. 1 is a simplified cross-sectional illustration of one exemplary prior art optical fiber cable.

The communication network transmission path 214 and the detection network transmission paths 216 may be separate paths established by separate fibers or fiber pairs of the same optical fiber cable 220. In one exemplary embodiment, the optical fiber cable may be configured as illustrated in FIG. 1.

Cables of different configurations may be used as long as they have separate fibers for supporting the detection and communication network paths and at least one power conductor. Those of ordinary skill in the art will recognize that the cable 220 need not be a continuous uninterrupted cable, and may instead be comprised of a number of smaller lengths of cable with devices, such as repeaters, coupled therebetween. For simplicity, the aggregated cable segments extending from one shore station to another is referred to herein as a "cable."

The communication network transmission path 214 may have repeaters 222-1, 222-2 . . . 222-N coupled along the length thereof. Those of ordinary skill in the art will recognize that, depending on system characteristics and requirements other active and passive components, such as gain equalization and dispersion compensation elements, branching units etc., may be incorporated into the transmission path 214. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The components in the transmission path 214 may include known configurations for achieving their intended functionality. The repeaters 222-1, 222-2 . . . 222-N, for example, may include any known optical amplifier/repeater configuration that compensates for signal attenuation on the transmission path 214. For example, one or more of the repeaters may be configured as an optical amplifier, such as an erbium doped fiber amplifier, a Raman amplifier, or a hybrid Raman/EDFA amplifier. One or more of the repeaters may not be an in-line optical amplifier, but may be a remotely pumped portion of the transmission path. Also, one or more of the repeaters may be provided in a known optical-electrical-optical configuration that regenerates an optical signal by converting it to an electrical signal, processing the electrical signal and then retransmitting the optical signal.

All of the elements, e.g. repeaters 222-1, 222-2 . . . 222-N, coupled to the communication network transmission path 214 may be powered in series by a constant electric current supplied on the power conductor 224 of the cable 220. The constant current may be provided by known power feed equipment (PFE) 226, 228 located at the shore stations and coupled the power conductor 224 at opposite ends of the cable 220. The PFE 226, 228 may be of the commercially available type suitable to power devices that may be located along the length of the transmission path 214. In one embodiment, the cable power conductor 224 may be coupled to a positive PFE terminal at one shore station and a negative PFE terminal at the opposite shore station. At each PFE 226, 228, the terminal that is not connected to the cable power conductor 224 may be connected to a ground potential, e.g. the ocean itself, to complete the circuit.

The detection network transmission path 216 may include couplers 230-1 . . . 230-N along the length thereof for coupling one or more detector wavelengths to and/or from the detection nodes 218-1 . . . 218-N. The couplers 230-1 . . . 230-N may include any known configuration for directing one or more detector wavelengths to and/or from the detector nodes 218-1 . . . 218-N. In one configuration, for example, the couplers 230-1 . . . 230-N may be configured as branching units that split the cable 220, for example, by physically directing one or more of the fibers forming the detection network transmission path to the detection nodes 218-1 . . . 218-N, and couple one or more fibers from the detection node backs to the detection network transmission path 216. Other known configurations may split the cable by converting the optical signals on the fibers forming the detection network transmission path to electrical signals, using an add-drop multiplexer to divide and recombine the signals on a path to the detection node, then reconverting back to optical signals. Other configurations use an optical add-drop multiplexer (OADM) to direct desired optical carrier frequencies to/from the detection nodes. Combinations of techniques may also be implemented.

In one embodiment, the detector wavelength(s) on which detector information is imparted by the detection nodes 218-1 . . . 218-N, may be amplified along the detection network transmission path 214 by associated optical amplifiers disposed, for example, in the couplers 218-1 . . . 218-N and/or in other locations. The signals at the detector wavelengths may also or alternatively be amplified or regenerated in the detector nodes 218-1 . . . 218-N. For example, the detector nodes 218-1 . . . 218-N may each include a transponder for converting a detector wavelength to an electrical signal, imparting detector information onto the electrical signal, converting the signal back to an optical signal and then imparting the signal back onto one or more of the fibers forming the detection network transmission path at the detector wavelength.

In addition to the couplers, detection nodes and/or amplifiers, those of ordinary skill in the art will recognize that, depending on system characteristics and requirements other active and passive components may be coupled to the detection network transmission path 216. All of the elements coupled to the detection network transmission path 216, may be powered in series by a constant electric current supplied on the power conductor 224 of the cable 220 by PFE 226,228 in the same manner that the elements coupled to the communication system network are powered.

System 200 may be configured as a long-haul system, e.g. having a length from the shore station 202 to the shore station 204 of more than about 400 km, and may span a body of water. When used to span a body of water, e.g. an ocean, the cable 220, repeaters 222-1, 222-2 . . . 222-N and couplers 230-1 . . . 230-N may be seated on the ocean floor and the cable 220 may span between beach landings to extend from the water for coupling to the shore stations 202 and 204.

To avoid undue complexity in the communication network transmission path 214 and to facilitate use of relatively simple and inexpensive equipment in detection network transmission path 216, the low bit rate signals on the detection network transmission path 216 may not be coupled through elements associated with the high bit rate signals of the communication network transmission path 214 and vice-versa. The detection network transmission path 216 may, for example, bypass the repeaters 222-1 . . . 222-N without being amplified by the same amplifiers that amplify the signals on the communication network transmission path 214, and the communication network transmission path 214 may bypass the couplers 230-1 . . . 230-N without being separated on to a fiber path to a detection node 218-1 . . . 218-N. Maintaining the communication network transmission path 214 and detection network transmission path 216 as entirely separate paths allows separate optimization of the network elements (repeaters, regenerators, equalization elements etc) and placement of network elements for the signals associated with the separate paths, and also facilitates use of components from different vendors and having different performance parameters. Taking advantage of a common PFE and cable may minimize cost and complexity of installation and maintenance of a system with separate communication and detection networks.

The detection network transmission path 216 and the communication network transmission path 214 are described herein as being entirely separate paths established by fiber(s)

of the same cable 220. It may, however, be desirable in some cases for signals on one path to be coupled through components associated with the other path. For example, it may be desirable in some cases to add a data channel to the communication network transmission path 214 through a path associated with a detection node 218-1 . . . 218-N. Also, in some cases, it may be desirable to amplify a signal from the detection network transmission path 216 in one or more repeaters associated with the communication network transmission path 214. It may also be desirable to monitor elements of one or more of the detection network nodes 218-1 . . . 218-N using one or more WDM channels transmitted through communication network. A system consistent with the present disclosure therefore is not limited to a system wherein the detection network transmission path 216 and the communication network transmission path 214 are entirely separate paths with no coupling of signals therebetween.

There is thus provided an optical communication system supporting detection and communication networks. The communication network transmission path 214 and the detection network transmission path 216 may be separate paths established by separate fibers or fiber pairs of the same optical fiber cable 220, and all of the elements coupled to the communication network transmission path 214 and the detection network transmission path 216 may be powered by the same PFE 226, 228 through the same optical fiber cable power conductor 224.

According to one aspect of the present disclosure, therefore, there is provided an optical communication system including: An optical communication system comprising: an optical fiber cable, the optical fiber cable comprising a plurality of optical fibers; a detection network transmitter for transmitting a detection network signal on a detection network transmission path comprising at least a first one of the plurality of optical fibers; at least one detection node coupled to the detection network transmission path, the detection node including at least one detector configured to detect at least one condition and provide detector data representing the detected condition on the detection network signal at a first data rate; and a communication network transmitter for transmitting a wavelength division multiplexed (WDM) signal on a communication network transmission path comprising at least a second one of the plurality of optical fibers; at least one channel of the WDM signal having a second data rate higher than the first data rate. According to another aspect of the present disclosure, there is provided an optical communication system including: a first shore station; a second shore station; an optical fiber cable extending from the first shore station to the second shore station through a body of water, the optical fiber cable including a plurality of optical fibers and a power conductor; a detection network transmitter for transmitting a detection network signal on a detection network transmission path including at least a first one of the plurality of optical fibers; at least one detection node coupled to the detection network transmission path, the detection node including at least one detector configured to detect at least one condition and provide detector data representing the detected condition on the detection network signal; a detection network receiver coupled to the detection network transmission path for receiving the detection network signal from the detection network transmission path; a communication network transmitter for transmitting a wavelength division multiplexed (WDM) signal on a communication network transmission path including at least a second one of the plurality of optical fibers; at least one optical amplifier coupled to the communication network transmission path for amplifying the WDM signal; at communication network receiver coupled to the communication network transmission path for receiving the WDM signal from the communication network transmission path; and power feed equipment (PFE) configured for supplying a current on the power conductor of the optical fiber cable for providing power to the at least one detection node coupled to the detection network transmission path and the at least one optical amplifier coupled to the optical communication network transmission path.

According to yet another aspect of the present disclosure, there is provided a method of providing an optical communication system supporting detection and communication networks, the method including: providing an optical fiber cable comprising a plurality of optical fibers; establishing a detection network transmission path comprising at least a first one of the plurality of fibers; coupling at least one detection node to the detection network transmission path for detecting at least one condition, imparting detector data onto a detection network signal to be provided at a first data rate on the detection network transmission path; and establishing a communication network transmission path comprising at least a second one of the optical fibers for carrying a wavelength division multiplexed (WDM) signal; at least one channel of the WDM signal having a second data rate higher than the first data rate.

The embodiments that have been described herein are but some of the several which utilize this disclosure and are set forth here by way of illustration but not of limitation. Many other embodiments, which will be readily apparent to those skilled in the art, may be made without departing materially from the spirit and scope of the disclosure.

What is claimed is:

1. An optical communication system comprising:
a first shore station;
a second shore station;
an optical fiber cable extending from said first shore station to said second shore station through a body of water, said optical fiber cable comprising a plurality of optical fibers and a power conductor;
a detection network transmitter at said first shore station for transmitting only one or more detection network signals on a detection network transmission path comprising a first one of said plurality of optical fibers, whereby said detection network transmission path carries only said one or more detection network signals, each of said detection network signals having an associated low data rate;
at least one detection node coupled to said detection network transmission path between said first shore station and said second shore station, said detection node including at least one detector configured to detect at least one condition and provide detector data representing said detected condition on at least one of said detection network signals;
a detection network receiver coupled to said detection network transmission path at said second shore station for receiving said at least one of said detection network signals from said detection network transmission path;
a communication network transmitter at said first shore station for transmitting only a wavelength division multiplexed (WDM) signal on a communication network transmission path comprising a second one of said plurality of optical fibers, said second one of said plurality of optical fibers being a different one of said plurality of optical fibers than said first one of said plurality of optical fibers, whereby said communication network transmission path carries only said WDM signal, each channel of said WDM signal having an associated high data rate higher than said associated low data rates of each of said detection network signals;
at least one optical amplifier coupled to said communication network transmission path for amplifying said WDM signal;
a communication network receiver coupled to said communication network transmission path at said second shore station for receiving said WDM signal from said communication network transmission path; and
power feed equipment (PFE) configured for supplying a current on said power conductor of said optical fiber cable for providing power to said at least one detection node coupled to said detection network transmission path and said at least one optical amplifier coupled to said optical communication network transmission path;
wherein said detection network transmission path extends between said first and second shore stations and bypasses said at least one optical amplifier whereby said at least one of said detection network signals is transmitted from said first shore station to said second shore station without amplification by said at least one optical amplifier, and
wherein said communication network transmission path extends between said first and second shore stations and bypasses said at least one detection node whereby said WDM signal is transmitted from said first shore station to said second shore station without passing to said at least one detection node.

2. An optical communication system according to claim 1, wherein said associated high data rate of at least one of said channels of said WDM signal is about 10 GB/sec or more, and wherein said associated low data rate of at least one of said detection network signals is less than about 10 times said associated high data rate of said at least one of said channels of said WDM signals.

3. An optical communication system according to claim 1, wherein said at least one detection network signal is provided on a single wavelength.

4. An optical communication system according to claim 1, said system further comprising at least one coupler coupled to said detection network transmission path for coupling said one or more detection network signals from said detection network transmission path to said at least one detection node.

5. An optical communication system according to claim 4, wherein said communication network transmission path bypasses said at least one coupler.

6. An optical communication system according to claim 1, wherein said optical fiber cable extends from said first shore station to said second shore station for a distance of greater than about 400 km.

7. A method of providing an optical communication system supporting detection and communication networks, said method comprising:
providing an optical fiber cable between a first shore station and a second shore station, said optical fiber cable comprising a plurality of optical fibers;
providing only one or more detection network signals on a detection network transmission path extending from said first shore station to said second shore station, each of said detection network signals having an associated low data rate, said detection network transmission path comprising a first one of said plurality of optical fibers;
coupling at least one detection node to said detection network transmission path between said first shore station and said second shore station for detecting at least one condition and imparting detector data onto at least one of said detection network signals on said detection network transmission path; and
providing only a wavelength division multiplexed (WDM) signal on a communication network transmission path extending from said first shore station to said second shore station, each channel of said WDM signal having an associated high data rate higher than said associated low data rates of each of said detection network signals, said communication network transmission path comprising a second one of said plurality of optical fibers, said second one of said plurality of optical fibers being a different one of said plurality of optical fibers than said first one of said plurality of optical fibers;
coupling at least one optical amplifier to said communication network transmission path for amplifying said WDM signal on said communication network transmission path; and
supplying an electrical current on a power conductor of said optical fiber cable for providing power to said at least one detection node and said at least one optical amplifier,
said detection network transmission path bypassing said at least one optical amplifier whereby said at least one of said detection network signals is transmitted from said first shore station to said second shore station without amplification by said at least one optical amplifier, and
said communication network transmission path bypassing said at least one detection node whereby said WDM signal is transmitted from said first shore station to said second shore station without passing to said at least one detection node.

8. A method according to claim 7, wherein said associated high data rate of at least one of said channels of said WDM signal is about 10 GB/sec or more, and wherein said associated low data rate of at least one of said detection network signals is less than about 10 times said associated high data rate of said at least one of said channels of said WDM signals.

9. A method according to claim 7, said system further comprising coupling at least one coupler to said detection network transmission path for coupling said one or more detection network signals from said detection network transmission path to said at least one detection node.

10. A method according to claim 9, wherein said communication network transmission path bypasses said at least one coupler.

11. A method according to claim 7, wherein said optical fiber cable extends from a first shore station to a second shore station for a distance of greater than about 400 km.

* * * * *